(Model.) 4 Sheets—Sheet 2.
J. TRIPP & J. H. OSBORN.
SEWING MACHINE.
No. 259,732. Patented June 20, 1882.
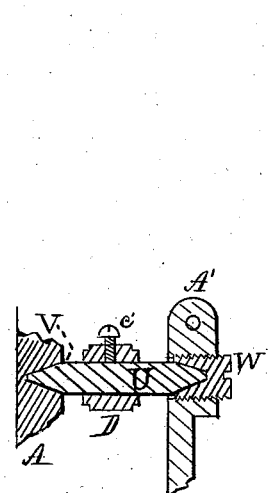
Fig. 18.
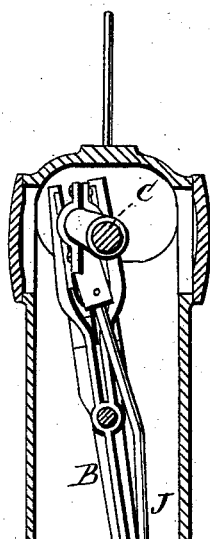
Fig. 3.
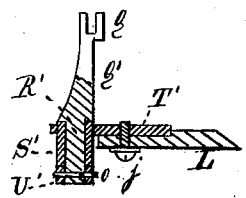
Fig. 16.
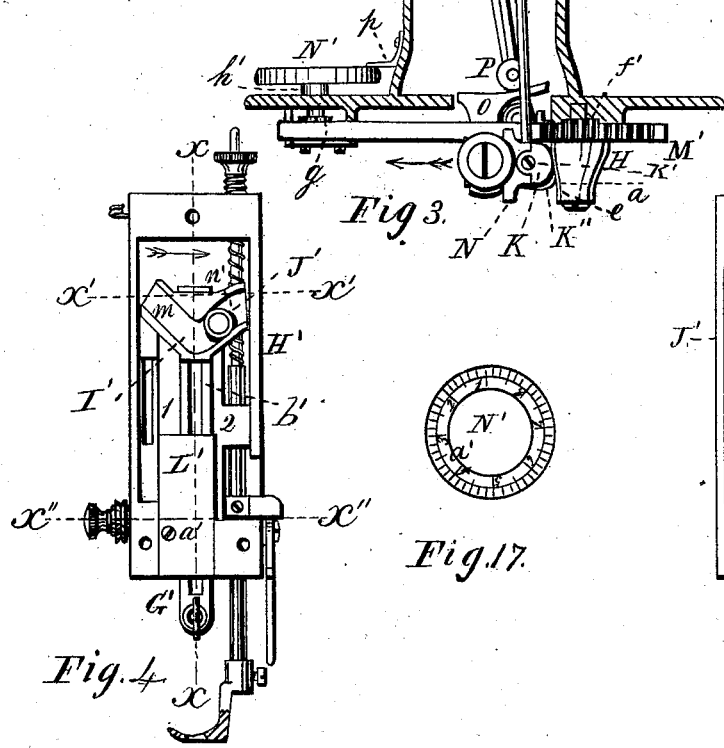
Fig. 4.
Fig. 17.
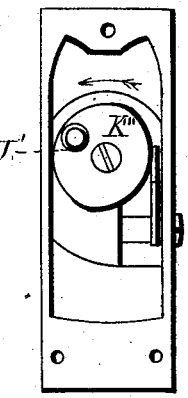
Fig. 5.
Witnesses. Inventors.

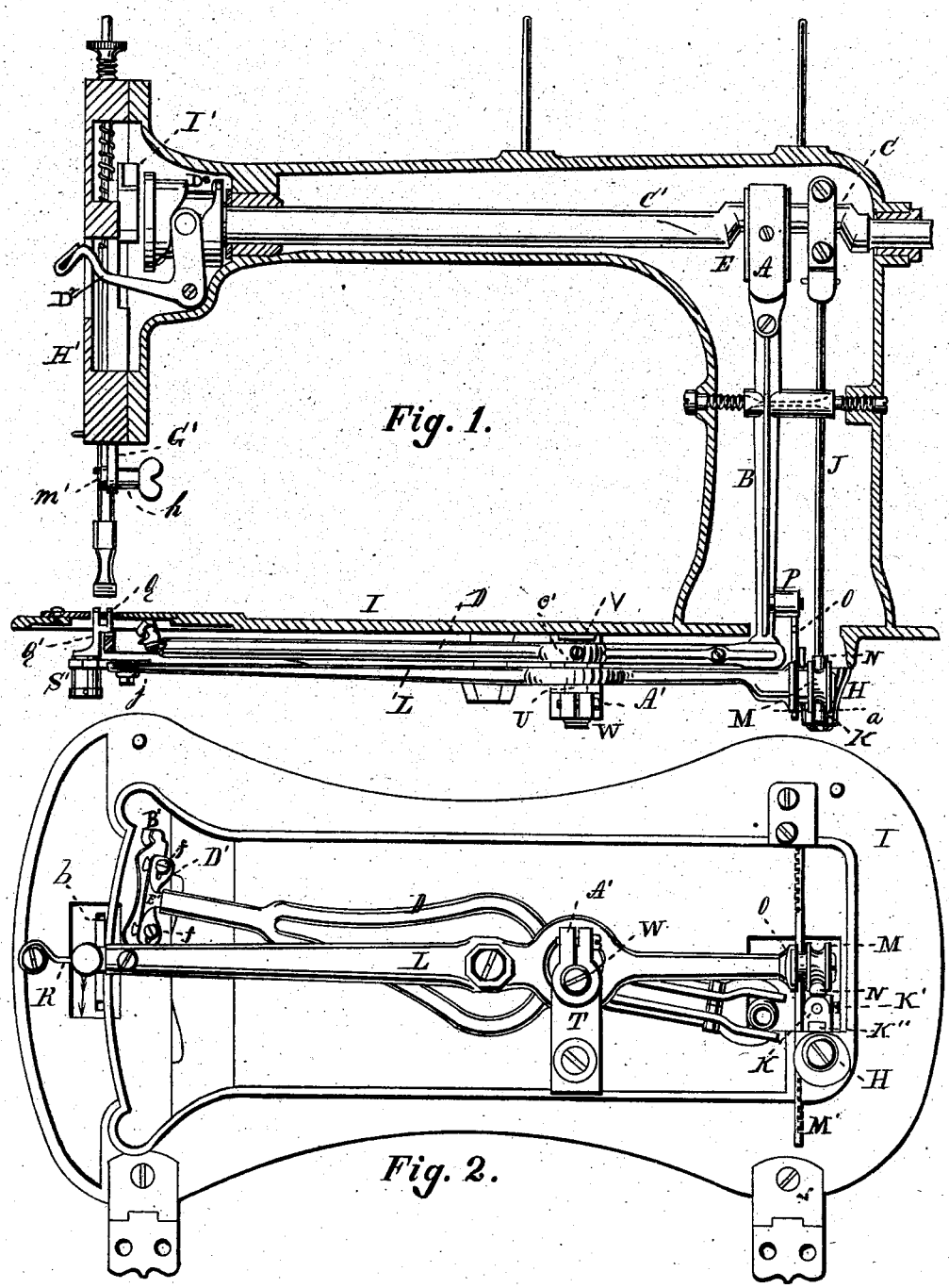

(Model.) 4 Sheets—Sheet 3.
J. TRIPP & J. H. OSBORN.
SEWING MACHINE.
No. 259,732. Patented June 20, 1882.
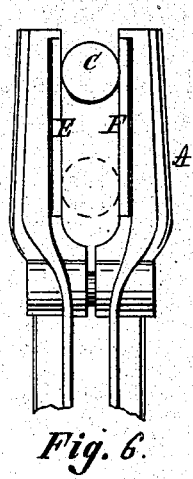
Fig. 6.
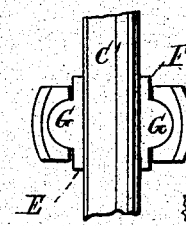
Fig. 7.
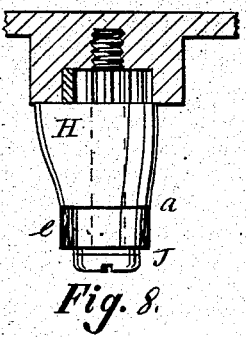
Fig. 8.
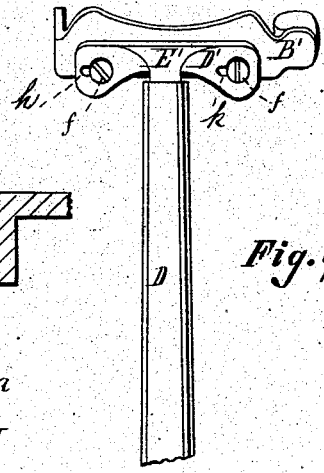
Fig. 9.
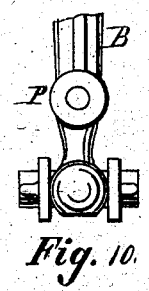
Fig. 10.
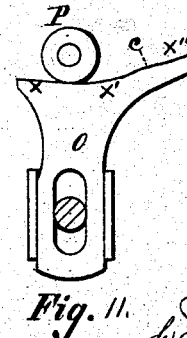
Fig. 11.
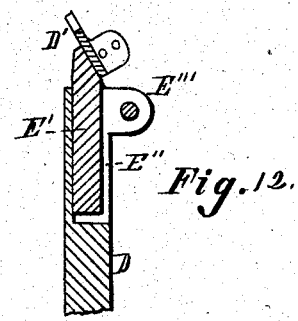
Fig. 12.
Fig. 15.
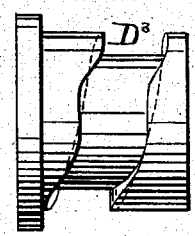
Fig. 13.
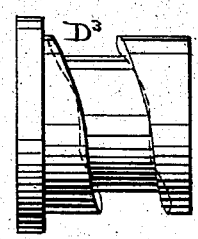
Fig. 14.
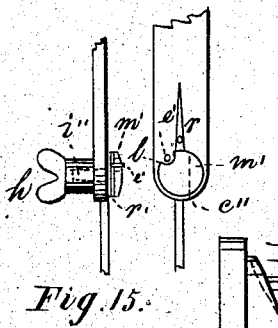
Witnesses.
J. H. Burridge
Chas Richard
Inventors.
James Tripp
J. H. Osborn
By W. H. Burridge Attorney.
N. PETERS, Photo-Lithographer, Washington, D. C.

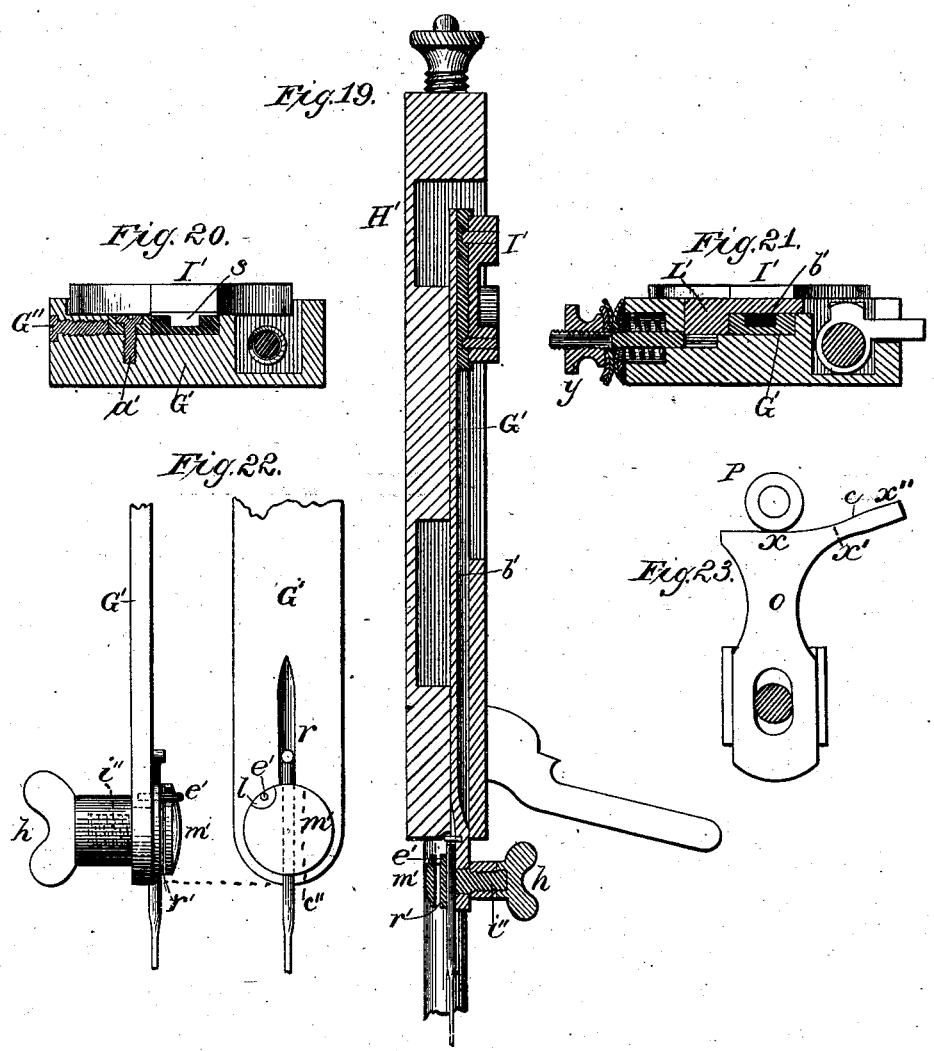

UNITED STATES PATENT OFFICE.

JAMES TRIPP AND JOHN H. OSBORN, OF CLEVELAND, OHIO, ASSIGNORS OF ONE-THIRD TO SAMUEL E. HENDERSON, OF KANSAS CITY, MISSOURI.

SEWING-MACHINE.

SPECIFICATION forming part of Letters Patent No. 259,732, dated June 20, 1882.

Application filed April 13, 1882. (Model.)

*To all whom it may concern:*

Be it known that we, JAMES TRIPP and JOHN H. OSBORN, of Cleveland, in the county of Cuyahoga and State of Ohio, have invented a certain new and Improved Sewing-Machine; and we do hereby declare that the following is a full, clear, and complete description thereof.

This invention relates to certain improvements in sewing-machines, whereby said machines are simplified in the details of structure and easily adjustable in the combination of parts, rendering the same light-running, durable, and readily understood and manipulated by the operator.

In the following specification will be found a full and complete description of the several improvements above alluded to, which are illustrated by the accompanying drawings, making a part of this specification, in which—

Figure 1 shows a vertical longitudinal section of the arm and bed-plate of the improved machine, showing the working parts therein. Fig. 2 represents an under side view of the machine. The rest of the figures are detached sections, to which reference will be made.

Like letters of reference refer to like parts in the several views.

The above-said improved machine is in its general structure not unlike those in ordinary use. Hence a description thereof is not thought essential for a full understanding of the improvements alluded to, as the general structure of the machine will be made manifest in the course of a description of the said improvements.

The bifurcated end or fork A of the vibratory lever B, connecting the crank C of the main shaft C' to the shuttle-lever D, is provided with a pair of self-adjusting blocks, E and F, Figs. 1, 6, and 7. Said blocks are secured respectively to the inner sides of the fork A, and form a bearing-surface for the movement of the crank of the shaft C', as seen in Figs. 6 and 7. Said blocks are retained in the fork by semicircular ribs G, extending the length of the blocks and adapted to fit in corresponding grooves in the sides of the fork, as seen in Fig. 7. The ribs of the blocks, though close-fitting in the grooves, are free to move or rock in the grooves, thereby allowing the faces of the block to adjust themselves to the line of the shaft or the crank thereof, in the event there should occur any variation in the lineal relation of the connecting parts. Hence there can be no cramping of the bifurcated end of the lever B in its connection with the wrist or crank of the shaft.

The peculiar device for regulating the feed of the machine—that is, for varying the length of the stitch and for operating the feed—consists of a feed-cam, H, secured to the under side of the bed-plate I of the machine by a bolt, on which the said feed-cam is free to revolve when operated by means presently shown.

The peculiar shape of the cam will be seen on examination of Figs. 2 and 8, in which it will be observed that the said cam consists of a tubular-like shell provided with differential radial lines—that is to say, the axial line of the cam is not equidistant from its external surface at its upper end, and it gradually lessens downward to the line *a*, below which it continues straight or cylindrical to the end, as shown in Fig. 8. Further attention will be called to this part of the machine.

J, Fig. 1, is a connecting-rod, the upper end of which is attached to the crank C of the shaft C'. To the lower end of the rod J is secured an adjustable block, K, Fig. 3, which is movable vertically upon the rod, and secured in position for the desired feed by means of the set-screw K'. In the side of the block facing the cam H is a groove, in which is held firmly a block of rawhide, K'', so adjusted as to be in tactual relation with the feed-cam H, as seen in Fig. 3, and upon which it slides for operating the feed, as presently shown.

L is the feed-lever, on one end of which is a grooved roller, M, Figs. 1 and 2, so arranged in relation to the connecting-rod J that the back piece, N, of the above-said block K is adapted to fit and move in the groove of the roller, as seen in Figs. 2, 3; also, to the end of the lever near to the grooved roller is firmly secured a boot-shaped cam, O, Figs. 1, 3, a detached view of which is shown in Figs. 11 and 23. As shown in said figures, the upper edge of the cam is slightly curved and grades upward, as seen at *c*. On the edge of the cam runs a roller, P, pivoted to the side of the vibratory lever B. The relation of the said lever, roller, cam, and feed-lever L is seen in Fig. 1. To the opposite end of the feed-lever is secured the feed Q, Fig. 1, passing upward into a slot, b, in the feed-plate of the machine in the ordinary way.

The practical operation of the above-described devices for actuating the feed is as follows: As the crank C above alluded to revolves a vertical movement is given to the feed to raise it above the face of the feed-plate by the vibratory stroke of the lever B, which, as it vibrates, the roller P, by virtue of the vibratory movement of the lever, rolls up the incline of the cam O, as seen in Fig. 3, thereby depressing the roller end of the feed-lever L and at the same time lifting upward the opposite end, projecting the feed Q above the face of the feed-plate, as seen in Fig. 1. During this upward movement of the feed the block K is at the lower end of the feed-cam H, as seen in Fig. 1, and momentarily at rest on the cylindrical part $e$ of the cam H, Figs. 3 and 8, and at the same time the roller P is moving along the tread of the cam O from the point X to about the point X', Figs. 11 and 23, during which time the feed is not moved vertically, as that part of the cam O is of the same arc of a circle as that described by the end of the vibrating lever B or roller P. The continued vibration of the lever B carries the roller from the point X' to X'' of the cam O, and in passing X' the feed is raised as the roller P moves in the direction of X'', and reversely on the return of said roller. Hence the feed is raised and lowered on the backward-and-forward motion of the roller on the cam O. There is no further elevation of the feed by the continued ascent of the roller upon the cam from $c$ to X''. While the roller is passing up said part X' of the cam to the point X'' and returning therefrom the block K is passing up the incline of the cam H. A transverse movement is given to the feed in direction of the arrow in Fig. 2 by the said upward movement of the block K, carried upward by the crank C and connecting-rod J. As the block K moves upward over the face of the cam H the swell of the upper part thereof pushes the block and that end of the feed-lever in contact therewith by means of the roller in the direction of the arrow in Fig. 3, causing the opposite end of the feed-lever to move in the direction of the arrow in Fig. 2, as aforesaid, thereby carrying the feed the length of a stitch. During this transverse movement of the elevated feed the rotative action of the crank C reacts upon the vibratory lever B, causing the roller P to roll down the incline of the cam O, thereby permitting the cam end of the feed-lever L to rise upward by the resiliency of the spring R, Fig. 2, which, as a consequence, depresses the opposite end of the lever and sinks the feed below the face of the feed-plate, at the same time the action of the spring moving the now-depressed feed back in the opposite direction from that above described—that is, in the opposite direction of the arrow in Fig. 2. This the spring can do, for the moment the roller has moved down the incline of the cam O the block K slides down to the foot of the cam H to the cylindrical part $e$. At this time the action of the feed is momentarily inactive—that is, during the forward throw of the shuttle. While the shuttle is returning the alternate and intermittent action of the feed mechanism is again repeated, as above described—that is to say, the reciprocating transverse action of the feed is effected by the co-operation of the cam H, block K, lever L, and spring R, and the alternating vertical action of the feed is accomplished by the co-operation of the cam O, roller P, and spring R, with their respective connections, with the crank C and feed-lever L, substantially as set forth.

D, Figs. 1 and 2, is the shuttle-lever. Said lever has its vibratory axis at T, and is secured by a set-screw, $c'$, Figs. 1, 18, to a shaft, U, so that it may be vertically adjusted on the shaft for regulating the height of the shuttle. The shaft alluded to is provided with center points fitted in suitable steps or bearings, V and W, Figs. 1, 2, and 18. The step V is a fixture, whereas the step W consists of a screw set in the clamp A', by which the screw is held securely from becoming loose, and by which, as the pivotal centers or bearings may become worn, the screw-bearing can be set up to make the bearings close-fitting.

The shuttle-carrier consists of a cradle, B', secured by set-screws $f$, Fig. 9, to the cross-head D', having a shank, E', adapted to fit in a slit socket terminating the end of the shuttle-lever D, as shown in Fig. 12.

The shank E' is preferably round and fits into a corresponding socket, which admits of a torsional movement of the cradle by turning the shank in the slit socket E'', and the shank E' is securely held in position by a set-screw passing through ears projecting from the socket on each side of the slit. The sides of the said slit are drawn together for clamping the shank of the shuttle cradle or carrier by a screw inserted in ears projecting from the sides of the slit. One ear, E''', only is shown in the sectional view of the socket and stem of the cross-head D'. In attaching the shuttle-carrier to the arm or lever D, as above described, the shuttle can be easily and readily adjusted in a horizontal position without bending or twisting the lever for that purpose, and by means of the set-screws $f$ the shuttle can be nicely adjusted in its transverse relation to the needle.

Fig. 19 is a vertical section of the face-plate and its mechanism in the direction of the line $x$ $x$, Fig. 4; Fig. 20, a transverse section in the direction of the line $x'$ $x'$ in Fig. 4; Fig. 21, a transverse section in the direction of the line $x''$ $x''$ in Fig. 4; Fig. 22, an enlarged view of Fig. 15, and Fig. 23 an enlarged view of Fig. 11.

On examination of the drawings it will be observed that the needle-bar G' does not extend up through the top of the face-plate H' of the machine. The upper end of the bar terminates within the chamber of the face, and is secured to a cross-head, I', provided with a heart-shaped cam-groove, m n', Fig. 4. Said groove is adapted to receive the roller J' on the pintle projecting from the face of the crank-wheel K''', Fig. 5, secured to the main shaft O', above referred to.

The needle-bar is operated by means of the roller J' on the pintle of the crank, in connection with the groove m n', by means of which a reciprocating movement is given to the needle-bar in the ordinary way.

The needle-bar is retained in a vertical position by the guides 1 and 2, between which it slides, and is prevented from leaving the guides by a gib or plate, L', Fig. 21, an integral part of the guide 1, which is adjustable laterally by the set-screw G'', Fig. 20, to make close the guides to the bar when worn loose.

To render the bar light a slot or groove, b', is cut longitudinally therein, thereby reducing it in weight, and not being extended up through the top of the face H' of the machine the weight of the needle-bar is materially lessened, so that the machine will run lightly and easily for having less metal to carry; also the above-said groove in the needle-bar serves to make the connection of the cross-head thereto more secure and durable by means of a rib on the back of the cross-head adapted to fit in the groove, thereby preventing the cross-head from becoming loose laterally, Fig. 20.

On the end of the needle-bar is secured a needle-clamp, which is also a thread-guide. Said clamp and thread-guide consists of a bolt having a broad head, m', Figs. 15 and 22. The stem or shank of the bolt passes through the needle-bar, as indicated at i'', Fig. 19, on which is screwed the thumb-nut h for drawing the head of the bolt upon the needle inserted in the groove r for clamping it to the bar. The said bolt or needle-clamp to be used as a guide for the thread has cut in the head thereof, parallel with the plane or top of the head, a slit, r', extending therein to about the dotted line c''. The width of the slit is sufficient to freely admit the thread used in sewing. In the outer edge or side of the slit is a notch, l, through which projects from the inner side of the slit a pin, e'.

The practical use of the guide is as follows: The thread from the spool is passed under the pin e', which is easily done by catching it under the projecting end thereof and then drawing it down under the pin in the notch l into the slit r' in the head of the clamp. When therein it cannot come out laterally, as the pin projecting across the slit will prevent it unless the thread is pulled upward around the pin and pushed therefrom through the notch.

A further improvement consists of an index for gaging the length of the stitch, and a device for adjusting the feed-cam for that purpose, of which the following is a description.

To the upper end of the feed-cam H, above described, is secured a pinion, f', adapted to engage the teeth of a rack, M', Fig. 3. Said rack extends from the pinion f' of the cam across to a pinion, g, secured to a shaft, h', projecting up through the bed-plate of the machine, as seen in Fig. 3. To the end of the shaft above the bed-plate is secured a dial, N', and on the lower end is the pinion g, above alluded to, engaging the opposite end of the rack M', as seen in Fig. 3. On the face of the dial are numerals 1, 2, 3, &c., with intermediate marks, forming a scale, as seen in Fig. 17.

In order to rotate the feed-cam H to bring the full side thereof more or less to the block K for vibrating the feed-lever, the dial is rotated, thereby moving the rack M' by the pinion g, which will also at the same time rotate the feed-cam in either direction, as the dial may be turned.

Figure 1 on the dial indicates a given short stitch used for fine thread, and figure 8 a long stitch for coarse thread. To set the machine to obtain the short stitch, the dial is turned so that figure 1 will be at the pointer p. This will turn the feed-cam so that its shortest throw will act upon the block K and vibrate the feed-lever the least degree and make the shortest stitch. The long stitch is made by turning the full side of the cam to the block K. This is done by rotating the dial so that the figure 8 will be at the pointer, and so of the intermediate numbers, according to the coarseness of the thread or the fineness of the stitching required. By this means the same length of stitch can always be obtained, though many changes may have been made for various work. The same exact length of stitch can always be had by turning the numerals of the dial to the pointer, thereby saving experimental trials ordinarily made to get the length of stitch desired or the one previously used and again wanted.

That the feed in its reciprocating action may travel in a right line instead of the arc of a circle described by the end of the feed-lever actuating the feed, said feed is attached to the end of the lever, as follows: The feed is provided with a shank, Q', Figs. 1 and 16, terminating in a round stem or spindle, R', fitting closely, but movably, in a sleeve, S', having an arm, T', whereby the sleeve is secured to the end of the feed-lever L by a screw, j, as seen in Fig. 1. On the end of the spindle is a collar, v', Fig. 16, secured thereto by a pin, o, otherwise inserted through the collar and the spindle of the feed, thereby holding the said spindle in the sleeve from coming out. The spindle, by being free to rotate in the sleeve, allows the feed to reciprocate horizontally in a right line, while the feed-lever vibrates and the end thereof describes an arc of a circle, which the feed would do were its spindle not free to rotate in the sleeve and thereby permit the feed to move in the straight slot in the feed-plate, which serves as a guide for the movement of the feed in a right line, that the work may be carried straight along under the needle.

The take-up $D^2$ is of ordinary construction, and is operated by the cam D³. (Shown in detail in Figs. 13 and 14.)

What we claim as our invention, and desire to secure by Letters Patent, is—

1. In a sewing-machine, the combination, with the driving-shaft C' and the crank C, of the bifurcated lever B, the self-adjusting blocks E and F, provided with longitudinal semicircular ribs adapted to fit and move freely in corresponding grooves in the bifurcations of said lever B, substantially as shown and described.

2. In a sewing-machine, the combination, with the cam H, having irregular and cylindrical portions, as described, of the feed-lever L, the block K, and mechanism for reciprocating the said block K, substantially as and for the purpose set forth.

3. In a sewing-machine, the combination, with the feed-cam H, having irregular and cylindrical parts, as described, of the feed-lever L, block K, rod J, crank C, and shaft C', substantially as and for the purpose set forth.

4. In combination with the feed-cam and feed-lever, provided with a grooved roller, an adjustable feeding-block having an anti-friction facing, and the back of the said block being adapted to move in the groove of the said roller, substantially as set forth, and for the purpose specified.

5. In a sewing-machine with the feed-cam H and pinion f', the combination of the rack M', pinion g, and thumb-piece or button N', substantially as and for the purpose set forth.

6. In combination with the feed-lever of a sewing-machine and bifurcated lever B and roller, the cam O, substantially as described, and for the purpose specified.

7. The bifurcated shuttle-lever D, secured to its rock-shaft, and adjustable thereon by means of a set-screw for regulating the height of the shuttle, in combination with the lever B and shaft C', substantially as and for the purpose set forth.

8. In a sewing-machine, the combination, with the shuttle-lever D, provided with a slit cylindrical socket, of the cross-head D', having a cylindrical shank and means for securing said shank in said socket, whereby the shank may be adjusted longitudinally and torsionally, substantially as set forth.

9. In combination with the cross-head D', the shuttle-cradle connected thereto by set-screws f, inserted in slotted openings k, for adjusting said cradle and shuttle therein, for the purpose specified.

10. The combination, with the face-plate H' and the needle-bar G', of the adjustable guide 1, having a gib or plate, L', formed integral therewith, and the stationary guide 2, said guides and needle-bar being arranged within the interior of the face-plate, substantially as and for the purpose set forth.

11. In a sewing-machine, the thumb-piece or button N', having on the surface or face thereof a numerical scale, a', index or pointer p, and pinion g, in combination with the rack M', pinion f', and feed cam H, in the manner substantially as and for the purpose set forth.

12. In a sewing-machine, a combined needle-clamp and thread-guide, consisting of a bolt having a slit in the side of the head thereof parallel with the plane or top of said head, and a notch in the outer side of the slit, through which projects a pin fixed in the inner side of the slit, and secured to the needle-bar by a thumb-nut, substantially as herein shown and described.

13. In a sewing-machine, the combination of the center-pointed shaft U, carrying the adjustable shuttle-lever D, step V, adjusting-screw, step W, and clamp A', substantially as and for the purpose set forth.

14. The combination, with the feed-lever L, of the feed, provided with a cylindrical shank or spindle, the sleeve S', having an arm, T', the collar or cap U', and pin O, substantially as and for the purpose set forth.

In testimony whereof we affix our signatures in presence of two witnesses.

JAMES TRIPP.
JOHN H. OSBORN.

Witnesses:
M. L. DEERING,
J. H. BURRIDGE.